UNITED STATES PATENT OFFICE.

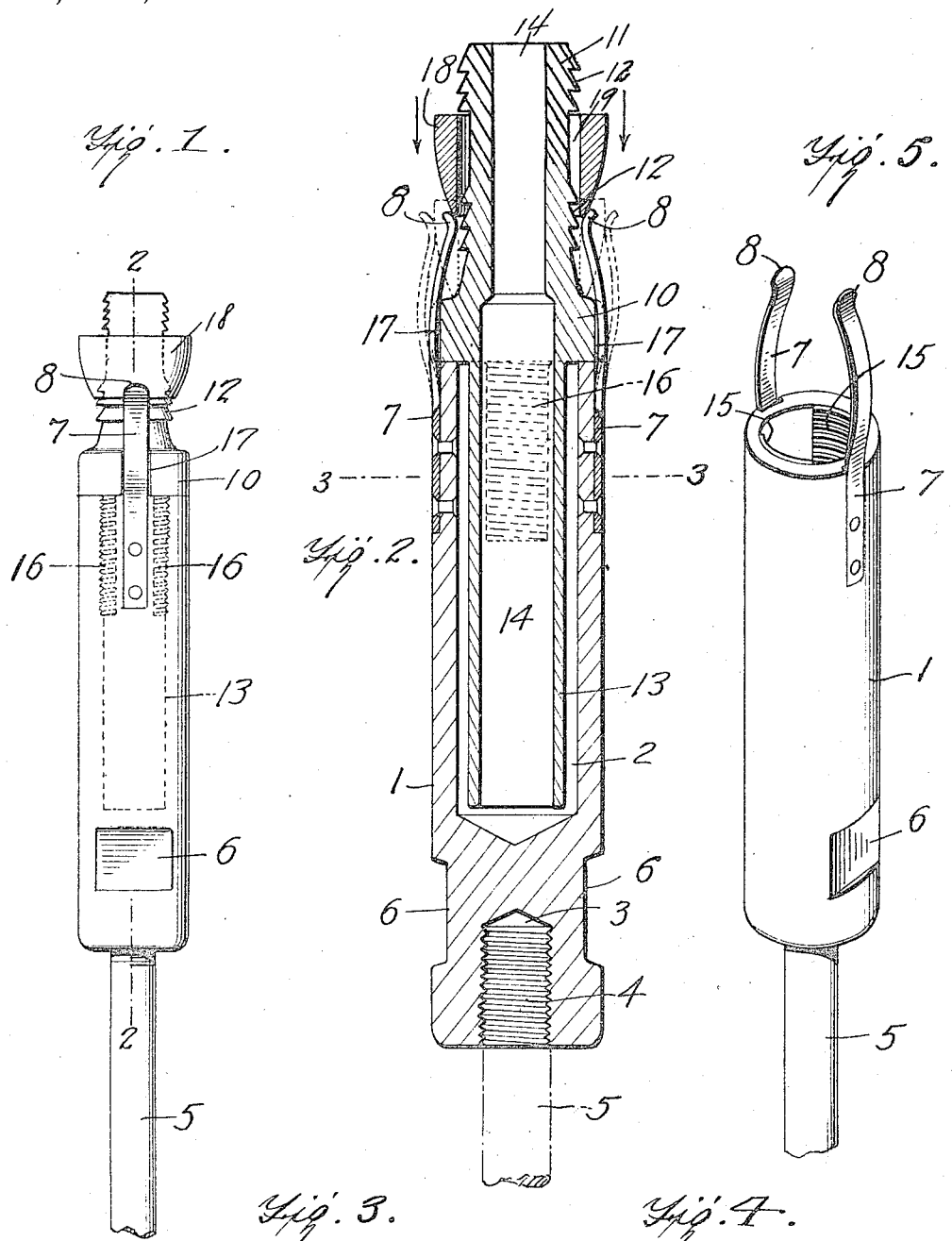

JOHN J. VARNER, OF SPENCER, WEST VIRGINIA, ASSIGNOR OF ONE-HALF TO JOHN D. RUSS, OF SPENCER, WEST VIRGINIA.

RELEASABLE WIRE-ROPE SOCKET FOR OIL-WELLS.

1,190,345.

Specification of Letters Patent. Patented July 11, 1916.

Application filed June 25, 1915. Serial No. 36,211.

*To all whom it may concern:*

Be it known that I, JOHN J. VARNER, citizen of the United States, residing at Spencer, in the county of Roane and State of West Virginia, have invented certain new and useful Improvements in Releasable Wire-Rope Sockets for Oil-Wells, of which the following is a specification.

The object of this invention is to provide a novel form of releasable wire-rope socket, for oil wells and the like, which will be simple in construction and thoroughly efficient in operation.

In the accompanying drawing, in which like reference-characters denote corresponding parts throughout the several views, I have, as an illustration, shown one form of embodiment of my invention capable of carrying out the underlying principles thereof.

The different figures or views of the drawing may be briefly described as follows:

Figure 1 is a side elevation of the device of my invention; Fig. 2 is a section on the line 2—2, Fig. 1; Figs. 3 and 4 are horizontal sections on the line 3—3, Fig. 2 showing the base member and the top member in engaged and released relations, respectively; and Fig. 5 is a detached detail view of the base-member.

Referring, now, in detail to the drawing: 1 designates what I prefer to term a base-member, which, as shown, is preferably cylindrical in shape, and provided with a longitudinally-extending, centrally-disposed socket 2, extending from the top and terminating short of the bottom thereof, and with a screw-threaded socket 3 extending upward from the bottom thereof and terminating short of the bottom of the socket 2. In use, the base 1 is engaged with the threaded top 4 of a sinker-pin 5, by being screwed thereon. Conveniently, the base 1 is provided with flat surfaces 6, 6 for engagement by a wrench in the operation of screwing the base upon the sinker-pin 5.

The base 1 carries, at its upper end, diametrically disposed, bowed leaf-springs 7, 7, which are bent toward each other, so that the upper ends thereof are nearer together than the lower ends. Said leaf-springs are disposed longitudinally, and the bowed portions thereof project above the top, of the base. Preferably, the free extremities, or upper tips, of said springs are bent away from each other, as shown at 8, 8.

What I prefer to term a top member preferably comprises an annular body portion 10; a reduced neck 11 rising from the body portion and preferably provided with circumferential, stepped serrations 12; and a depending stem 13. Throughout the entire length of said top member extends a central bore or opening 14, which may be of reduced diameter through the neck 11, as shown in Fig. 2.

The top and base members may be suitably removably secured together in any suitable manner and by any suitable means; but the means described as follows are preferred for the purpose: The inner surface of the base-member 1 is provided with diametrically-opposite, longitudinally-extending, screw-threaded portions 15, 15, and the exterior of the stem 13 of the top member is provided with diametrically-opposite, longitudinally-extending, screw-threaded portions 16, 16; so that, by projecting the stem 13 into the socket 2 and giving the same a quarter turn or revolution, the threaded portions, referred to, carried by the top and base members, respectively, engage and thus detachably hold said members together. The means described and illustrated, for holding the two members together, are merely illustratory of one of a number of ways of detachably holding them together.

The body-portion 10 of the top member is provided, exteriorly, with diametrically-opposite, longitudinally-extending grooves 17, 17, in which the springs 7, 7 normally rest, thereby holding the base and top members in independently non-revoluble relation, and, consequently, preventing unintentional or accidental unscrewing of the top member from the base member.

A conoidal wedge, or spring-releasing member, 18 is seated upon the tips 8, 8 of the springs 7, 7, and encircles the top of the neck 11, and is provided with a central, longitudinal opening 19 therethrough, of diameter larger than the width of the neck 11 of the top member.

In use, the base 1 is first firmly screwed on the sinker 5. After the wire rope has been securely fastened into the neck 11 of the top member, the latter is inserted into the socket 2 of the base member 1, and given a one-fourth turn, which securely engages the threads of the base and top members; and, at the same time, the leaf-springs 7, 7 spring into the grooves 17, 17. The entire device, with the sinker screwed into the bottom of the base-member 1, is then lowered by the wire rope into the bottom of the well or tubing. Sometimes, the sinkers, together with the valves, become sanded fast in the bottom of the well, and it is necessary to pull out the tubing. It is necessary, of course, where no means of disengaging the wire rope are provided, to pull out the tubing and the wire rope together, which results in destroying the wire rope. In my device, the wire rope can be released in the following very simple and expeditious manner: The rope, at its top end, is reeved through a piece of piping, or other hollow weight, which is permitted to fall down the rope, by gravity, until it strikes the top of the wedge or spring-releasing member 18, whereupon, due to the weight of such piece of piping, or the like, and by force of the impact thereof against said wedge 18, the latter is driven downward into the dotted line position thereof shown in Fig. 2, thereby spreading apart the springs 7, 7 to the dotted line position thereof shown in Fig. 2. It is obvious, of course, that the top member, to which the wire rope is secured, may now, by being given a quarter turn in a reverse direction, be disengaged from the base member 1, and the wire rope, without damage thereto, be withdrawn from the tubing. If the wire rope should break at any time, a "fishing" tool (in common use) may be let down the tubing, so as to engage the serrations 12, and withdraw the rope.

While I have, for the purpose of complying with the provisions of the patent statutes, described with great particularity a specific embodiment, or concrete exemplification, of my invention, it is to be understood that details may be changed, and modifications made, within the terms of the appended claims, without departing from the spirit of my invention, or sacrificing any of its advantages.

Having thus fully described my invention, what I claim as new, and desire to secure by Letters-Patent of the United States, is:

1. A releasing device for the cable-line of oil-well machinery, comprising, in combination, a base-member having, at one end thereof, a longitudinally-extending, threaded socket for engagement with the threaded end of a sinker-pin and, extending from the other end thereof, a second, longitudinally-extending socket; a top-member projecting into said socket and provided with a longitudinally-extending socket in which a wire-cable may be secured; said top and base members having coöperating, interrupted threaded portions engageable by a partial revolution of one member with respect to the other; bowed leaf-springs carried by said base member; said top-member having grooves normally engaged by said springs to lock the top and base members against independent revolution; and a conoidal weight adapted by gravitational descent on the wire-cable to bear against said leaf-springs and remove them from engagement with said grooves.

2. A releasing device for the cable-line of oil-well machinery, comprising, in combination, a base-member having, at one end thereof, a longitudinally-extending, threaded socket for engagement with the threaded end of a sinker-pin and, extending from the other end thereof, a second, longitudinally-extending socket; a top-member projecting into said socket and provided with a longitudinally-extending socket in which a wire-cable may be secured; said top and base members having coöperating, interrupted threaded portions engageable by a partial revolution of one member with respect to the other; bowed leaf-springs carried by said base-member; said top-member having grooves normally engaged by said springs to lock the top and base members against independent revolution; and a conoidal weight adapted by gravitational descent on the wire-cable to bear against said leaf-springs and remove them from engagement with said grooves; said top portion being provided, on the portion thereof projecting exteriorly of said base-member, with circumferential, stepped serrations for engagement by a fishing-tool.

In testimony whereof, I affix my signature in presence of two witnesses.

JOHN J. VARNER.

Witnesses:
W. D. DE PUE,
GROVER F. HEDGES.